United States Patent [19]

Lefever et al.

[11] Patent Number: 5,224,518
[45] Date of Patent: Jul. 6, 1993

[54] BEAM SEATING ARRANGEMENT IN A LOOM DOFFER

[75] Inventors: Bart Lefever, Ieper; Geert Ostyn, Moorslede, both of Belgium

[73] Assignee: Picanol N.V., naamloze vennootschap, Belgium

[21] Appl. No.: 808,746

[22] Filed: Dec. 17, 1991

[30] Foreign Application Priority Data

Dec. 17, 1990 [BE] Belgium .................... 9001206

[51] Int. Cl.⁵ ........................................... D03D 49/00
[52] U.S. Cl. ........................ 139/1 R; 242/56 R; 242/58.6
[58] Field of Search ............... 139/1 R; 414/911; 242/58, 58.2, 58.3, 58.6, 56 R; 28/208; 66/148

[56] References Cited

U.S. PATENT DOCUMENTS

| | | | |
|---|---|---|---|
| 4,778,122 | 10/1988 | Snygg | 242/58.6 |
| 4,910,837 | 3/1990 | Fujimoto et al. | 139/1 R X |
| 4,934,413 | 6/1990 | Yao | 139/1 R |

FOREIGN PATENT DOCUMENTS 0360753 3/1990 European Pat. Off. .
769302 3/1957 United Kingdom .

Primary Examiner—Andrew M. Falik
Attorney, Agent, or Firm—Bacon & Thomas

[57] ABSTRACT

A device for attaching an element in a frame includes a seating, a supply path via which the element to be attached is brought to the seating, and a pivotable member. In a first position of the pivotable member, a first end thereof is situated in the supply path. In a second position, the first end is situated outside the supply path and a second end of the pivotable member to move the pivotable member between its first and second positions. The first position of the pivotable element is an overcenter position in which the relative positions of the pivotable member's pivot point, the seated element, and the point of contact between the seated element and the first end of the pivotable member are arranged to retain the seated element in place within the seating. In the second position of the pivotable member, the transport device moves the element via the supply path into and out of position in the seating.

11 Claims, 6 Drawing Sheets

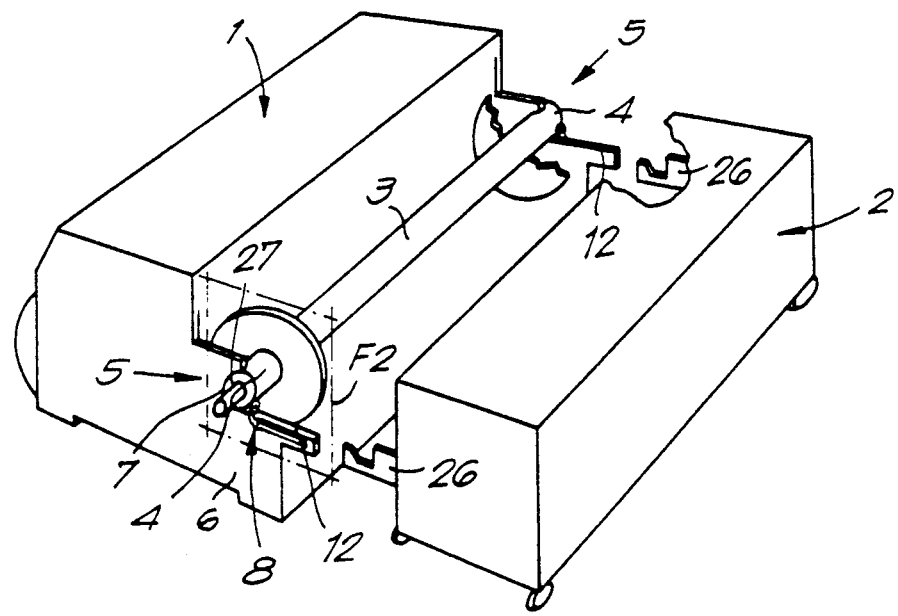
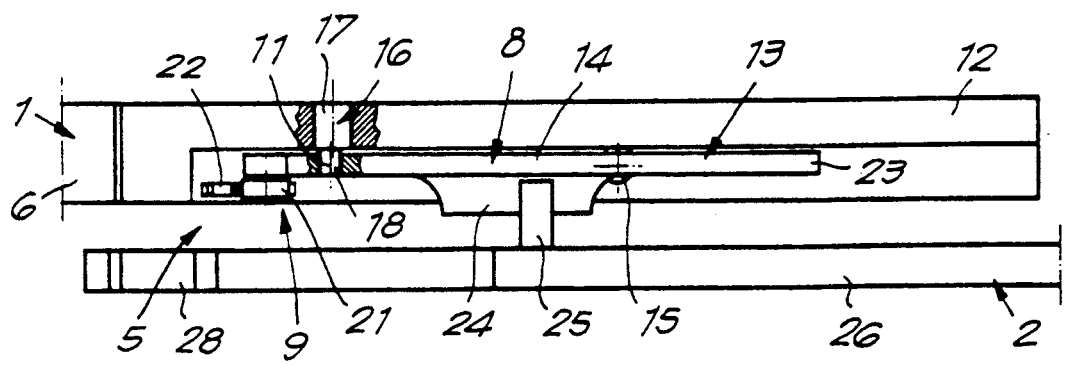

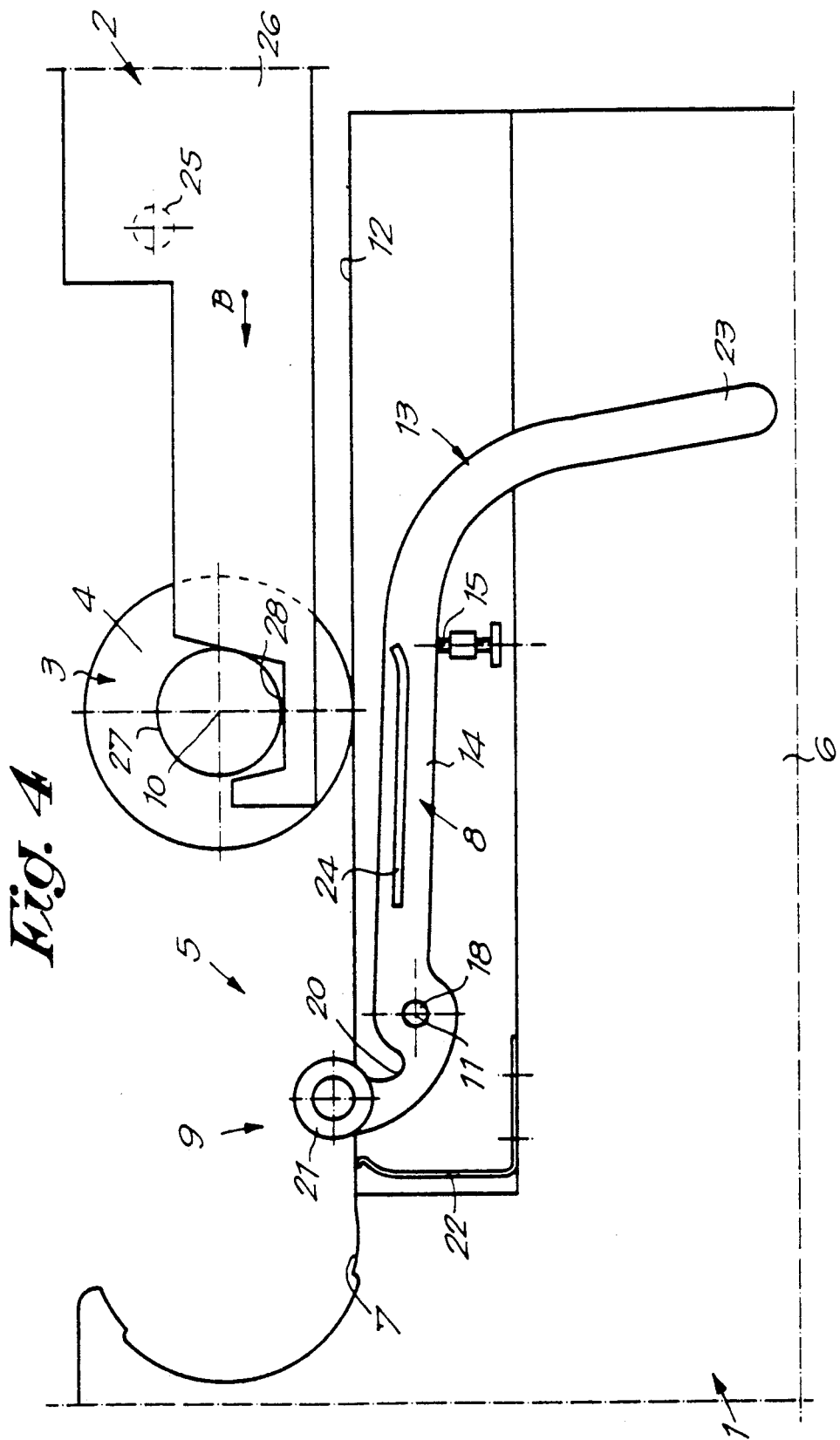

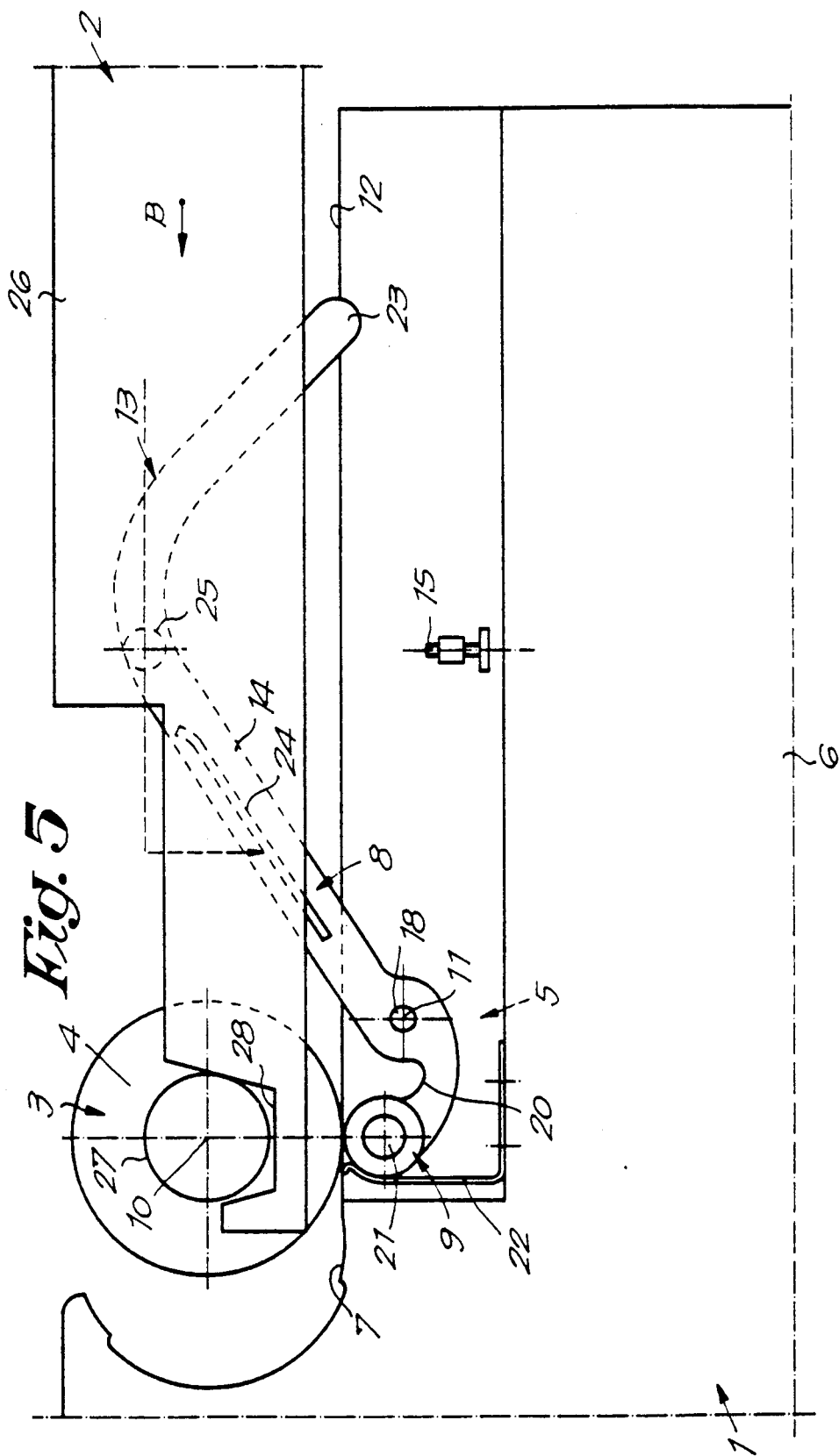

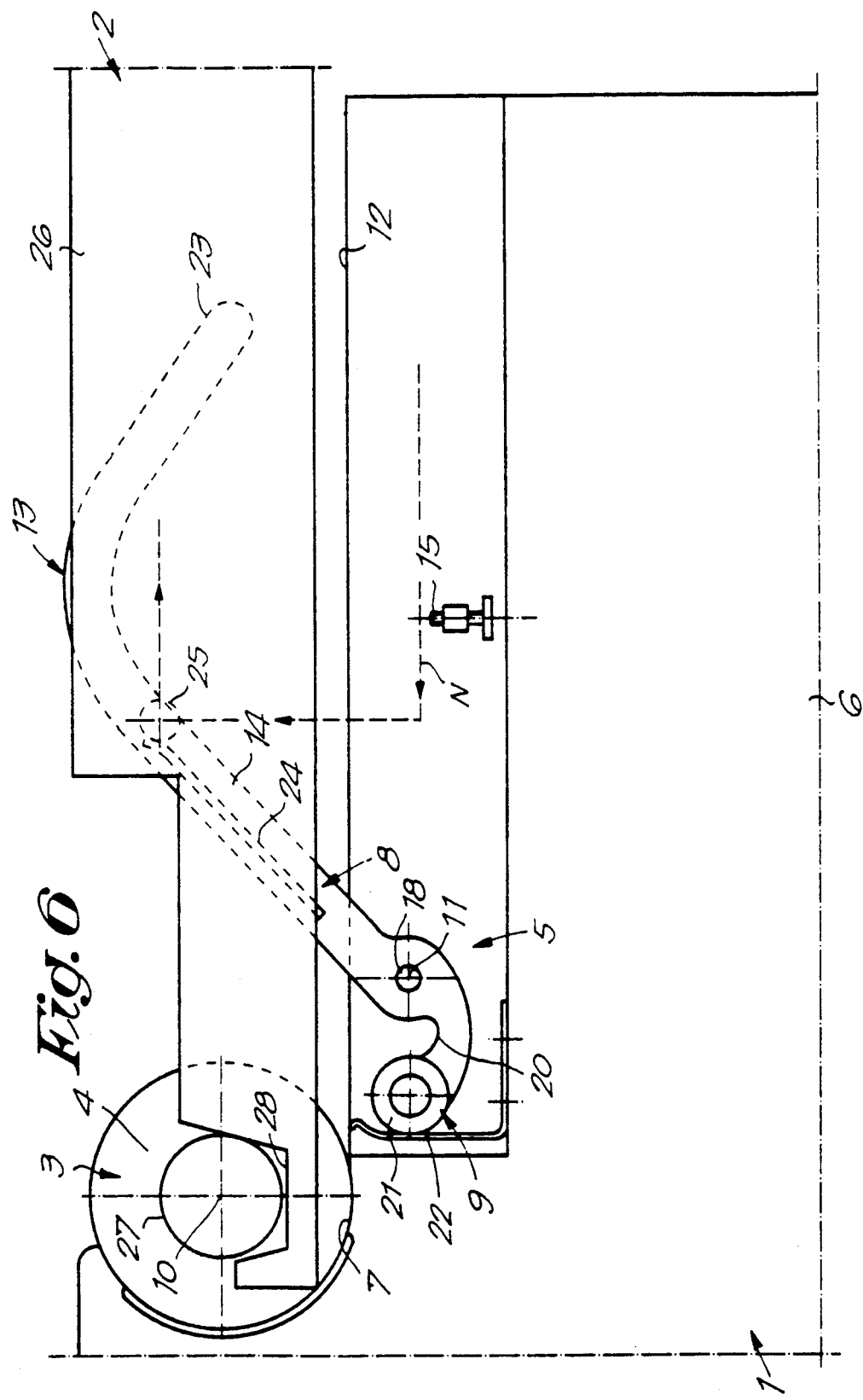

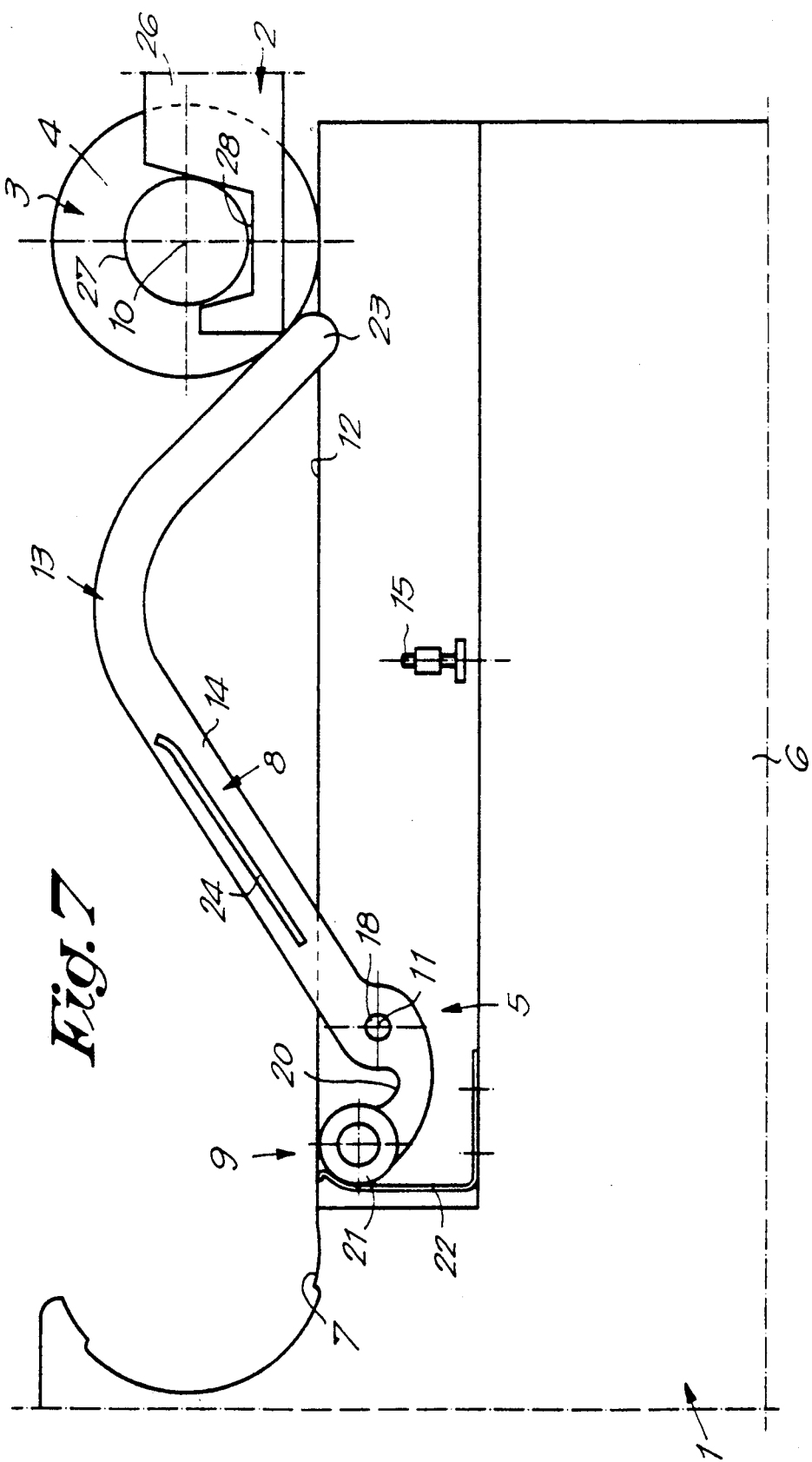

1

BEAM SEATING ARRANGEMENT IN A LOOM DOFFER

BACKGROUND OF THE INVENTION

The present invention concerns a device for attaching an element in a frame.

The device is meant in the first place for attaching removable elements provided with shaft ends, in textile machines, such as for attaching beams, either warp beams or cloth beams, warp stop motions, harness guides and such like in weaving machines.

It is known that in weaving machines the warp beam, the cloth beam, the warp stop motion, the harness guides and a number of other parts are attached by means of shaft ends at both sides in the frame of the weaving machine. Traditionally, use is made hereby of bearing blocks which are closed off by means of bearing lids. The bearing lids are hereby screwed to the bearing blocks by means of bolts. This known embodiment is disadvantageous however in that tools ar always needed and in that it costs relatively much time to loosen and respectively fasten the attachment.

SUMMARY OF THE INVENTION

The present invention concerns a device for attaching an element in a frame which does not have the disadvantages of known attachment devices.

The invention therefore aims to provide an attachment device which is characterized by a simple construction, using few parts.

In order to realize the objectives of the invention, a device for attaching an element in a frame, is provided with a seating, a supply path via which the element to be attached can be brought to the seating, and a pivotable member with two ends. In a first position, the first end, meant to cooperate with the element to be attached in the seating, is situated in the supply path and in a second position, the first end is situated outside the supply path and the second end inside the supply path.

In the preferred embodiment the pivotable member includes a lever which is pivotably attached to the frame, and a press-on wheel is provided at one end which makes contact with the element placed in the seating.

The other advantages of the present invention are described hereafter.

BRIEF DESCRIPTION OF THE DRAWINGS

In order to better explain the characteristics according to the invention, by way of example only and without being limitative in any way, the following preferred embodiment is described with reference to the accompanying drawings, where:

FIG. 1 is a schematic representation of a weaving machine equipped with a device according to the invention as well as with a transport device;

FIG. 3 shows a view according to arrow F3 in FIG. 2;

FIGS. 4 to 7 show different positions of the device in FIG. 2.

DETAILED DESCRIPTION OF THE PREFERRED EMBODIMENTS

Figure 2:
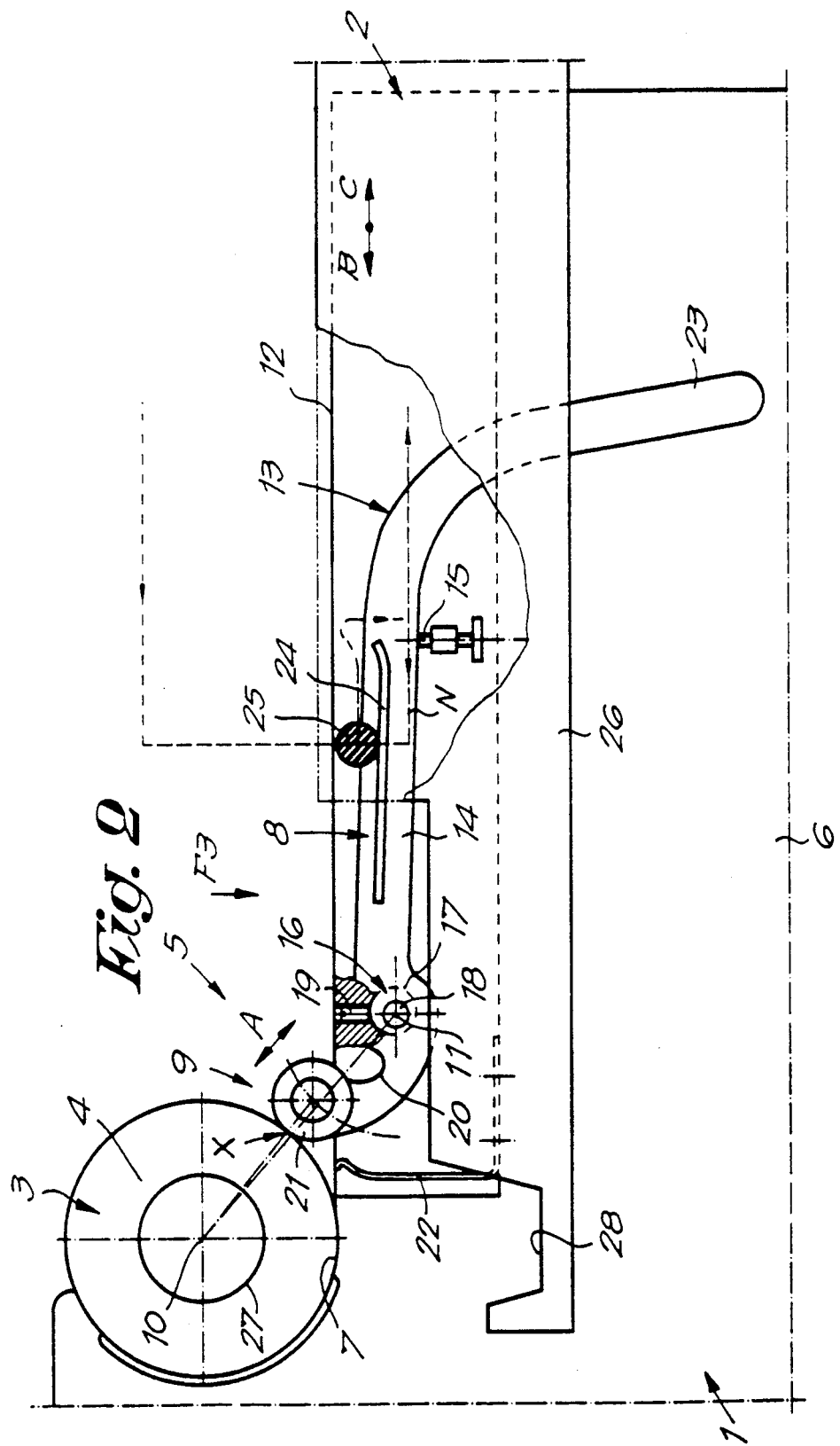
FIG. 2 provides a view to a larger scale of the part indicated in FIG. 1 by F2.

FIG. 1 provides a schematic view of a weaving machine 1 and a transport device 2 for the introduction and/or removal of a removable element, in this case a warp beam 3. The warp beam 3 has as is known a shaft or shaft end 4 on both ends with which it can be attached by devices 5 to the frame 6.

The devices 5 each include as shown in FIGS. 2 and 3, a seating 7 for the shaft 4 to be attached and a pivotable member 8 of which one end 9 can cooperate with the shaft 4 so as to keep it in place in the seating 7, whereby the end 9 is situated such that it forms an over-center with regard to the center point 10 of the seating 7 and with regard to the point of rotation 11 of the pivotable member 8.

The seating 7 extends over a maximum angle of less than or equal to 180 degrees, such that, provided member 8 turns over sideways, the shaft 4 can always be taken out of the seating 7 or can be introduced in it. The seating 7 is situated at the end of the supply path 12, like a bearing face, along which the shaft 4 can be rolled or introduced in the seating 7.

Pivotable member 8 includes a lever. At the lever end 13 situated opposite the above-mentioned end 9 a lever arm 14 has been provided.

In the first position or locked situation, as shown in FIG. 2, movement of pivotable member 8 is limited by means of a preferably adjustable stop 15. As shown, this stop 15 has been mounted under the lever arm 14. In the position where the lever arm 14 makes contact with the stop 15 the place X where the end 9 works in conjunction with the shaft 4 is situated just past the connecting line between the center point 10 and the point of rotation 11, one and other such that when the shaft 4 is forced out of its seating 7, the lever arm 14 is pressed onto the stop 15 with a greater force, thus keeping the device locked.

The position of the pivot point 11 is preferably adjustable, for example by means of a resulatable eccentric 16. This makes it possible for the end 9 of the rotatable element 8 to be shifted according to a direction A, as a result of which this end can be pressed onto the shaft 4 with a greater or less great force.

The regulatable eccentric 16 consists, as shown in the FIGS. 2 and 3, of a shaft 17 which can rotate in the frame 6 and which is provided with an eccentrically mounted shaft 18 on which the pivotable member 8 is borne such that the shaft line of this shaft 18 forms the above-mentioned pivot point rotation 11. The shaft 17 can be fixed in any angle or position with regard to the frame 6 by means of a screw 19.

It is clear that the pivotable member 8 is placed such that it is elastically deformed between the point of rotation 11 and the end 9 during the locking. In order to allow for an elastic deformation the pivotable member 8 is made in a bent shape between the point of rotation 11 and the end 9. Moreover, a weakening 20 may have been provided in this part in order to increase the elasticity and make it possible to open and close the device.

In order to restrict the force to be exerted for the closing or opening, a roll or wheel 21 has been preferably mounted on the end 9 of the pivotable member 8 which is fixed in a rotating manner. This wheel 21 also makes it possible for the shaft 4 to rotate with regard to the pivotable member 8 without too much friction.

As shown in the FIGS., the pivot point 11 is situated under the supply path 12. Member 8 is situated such that in the first position, namely the locked situation, the end 9 is in the supply path 12, whereas the end 13 is situated under the supply path 12. In the second position, namely the unlocked position, the end 9 is situated under the supply path 12, whereas the end 13 is then situated in the supply path 12.

Further, means 22 can be provided with which the pivotable member 8 can be kept in its unlocked position. As shown in FIG. 4, these means 22 consist of for example a bent leaf spring behind which the end 9, and in particular the wheel 21, can clutch.

A guide piece 23 has also been applied to the lever arm 14 whose aim will become clear from the description below. This guide piece 23 can also function as a handle. This guide piece 23 is preferably situated such that it still reaches under the supply path 12 when the pivotable member 8 is in the above-mentioned second position.

As shown in FIG. 3 the lever arm 14 is provided sideways with a guide piece 24 which can work in conjunction with an elastic tap 25 which has been mounted on the transport arm 26 of the transport device 2.

The removable element 3 is provided at its ends with means 27, such as shaft ends, whereby this element 3 can be retained. These means 27 can hereby cooperate with the gripper openings 28 of the transport arms 26.

The working of the device is described hereafter with reference to the different positions shown in the FIGS. 2, 4, 5, 6 and 7.

When introducing a new warp beam 3 or such like the shaft 4, as shown in FIG. 4, is moved or rolled over the bearing surface of the supply path 12, bearing surfaces respectively, according to a direction B, whereby the situations as shown in FIGS. 4, 5 and 2 are subsequently brought about.

In the case where the element 3 is introduced by means of the transport device 2, the elastic taps 25 pass freely over the pivotable members 8 during the movement B. When the shaft 4 is in the seating 7, the transport arms 26 are moved downward into the position according to FIG. 2. At this time the elastic taps 25 at each of both arms 26 press onto the guide pieces 24 of the pivotable members 8, as a result of which each lever arm 14 is pressed onto its accompanying stop 15, and the element 3 is thus locked in the seatings 7.

Subsequently, the transport arms 26 are withdrawn according to direction C, such that the transport device 2 can move to another place.

In order to remove the element 3 from the seating 7, the pivotable members 8 are pivoted, for example into the position according to FIG. 5, such that the end 9 is retained behind the leaf spring 22. Subsequently, the shaft 4 is moved or rolled from the seating 7 over the bearing surface of the supply path 12, such that the element 3 can be removed from this bearing surface. As the shafts 4 are moved or rolled over the bearing surface 12, these shafts 4 make contact with the lever arm 14, as a result of which the pivotable members 8 fall back onto the stops 15, and end up in a position as shown in FIG. 4. The shafts 4, and thus the removable element 3, can then be carried off unhindered according to direction C.

In the case where use is made of the transport device 2 to open the devices 5 and remove the element 3, the transport arms 26 are presented to the weaving machine 1 at a height as shown in FIG. 2. By moving the transport arms 26 according to direction B these transport arms 26 are brought into the position according to FIG. 2 whereupon the elastic taps 25 now pass under the guide pieces 24, in particular according to the indicated way N.

In order to remove the element 3 the transport arms 26 are raised into the position represented in FIG. 6. By moving the transport arms 26 according to direction B, transport arms 26 are brought into the position where the elastic tabs 25 now pass under the guide pieces 24, in particular according to the pattern indicated by dashed line N in FIGS. 2 and 6. Hereby the taps 25 make contact with the bottom side of pieces 24, as a result of which the pivotable members 8 are unlocked and turned into the position according to FIG. 6.

Subsequently, the element 3 can be taken from the seating 7 by withdrawing the transport arms 26. In this example the ends 9 of the elements 8 form no hinderance as the element 3 is removed, because, when the transport arms 26 are moved in direction C, the pivotable members 8 are stopped by the taps 25 which work in conjunction with the guide pieces 24. If the taps 25 cooperate sufficiently long with the guide pieces 24, the leaf springs 22 are superfluous. If however the guide pieces 24 are rather short, the rotatable elements 8 can be retained in their unlocked position by means of leaf springs 22 or the like.

It is clear that as they are moved further according to the direction C, the pivotable members 8 are moved back into the position shown in FIG. 4, which has the advantage that the devices 5 are always put back into a position such that a new element 3 can be automatically placed in the seatings 7.

It should be noted that the transport arms 26 are at the same height in the FIGS. 5 and 6, which has the advantage that these transport arms 26 only have to be able to operate at two heights.

In the case where the pivotable member 8 of any of the devices 5 should nevertheless be in a position as shown in FIG. 7, for example following a manual intervention, the shaft 4 of an element 3 which is being introduced will make contact with the guide piece 23, as a result of which the pivotable member 8 will automatically be moved to the position according to FIG. 4.

In the case where the leaf spring 22 is placed such that the rotatable element 8 is not forced behind the leaf spring 22 as the shaft 4 is introduced, or in the case where there is no leaf spring 22, the device will be placed in the locked position whether or not automatically, depending on the geometry and the weight of pivotable member 8.

It is clear that the above-mentioned shaft ends or shafts 4 do not necessarily have to have a round shape.

The present invention is in no way limited to the embodiment described by way of example and shown in the accompanying drawings; on the contrary, such a device for attaching an element in a frame can be made in various sorts of variants while still remaining within the scope of the invention.

We claim:

1. A device for attaching an element to a frame, comprising:

a seating; means including a supply path along which the element to be seated is moved to the seating; a pivotable member having first and second ends; means for causing, in a first position, the first end to be situated in the supply path and engaged said element when said element is seated in said seating to thereby retain said element in said seating; and means for causing, in a second position, the first end to be situated outside the supply path and the second end to be situated in the supply path to thereby permit movement of said element to and from said seating along said supply path, said second end including means responsive to movement of said element along the supply path for causing corresponding movement of said pivotable member relative to said two positions.

2. A device as claimed in claim 1, further comprising means for mounting the seating and the pivotable member such that a point where the pivotable member contacts the element is situated away from the connecting line between a center point of the element when seated and a pivot point of the pivotable member, thereby forming an overcenter mechanism.

3. A device as claimed in claim 1, wherein a pivot point of the pivotable member is situated away from the supply path.

4. A device as claimed in claim 1, further comprising means including a stop for limiting movement of the pivotable member when the pivotable member is in said first position.

5. A device as claimed in claim 1, wherein a portion of the pivotable member extending between a pivot point of the pivotable member and the first end is elastically deformable.

6. A device as claimed in claim 1, further comprising means including a wheel mounted on the first end of the pivotable member for contacting the element to retain the element in the seating.

7. A device as claimed in claim 1 further comprising means for retaining the pivotable member in the second position.

8. A device as claimed in claim 1, wherein the second end of the pivotable member comprises a lever arm.

9. A device as claimed in claim 8, wherein said lever arm includes at one end thereof means including a guide piece for contacting the element to thereby cause the pivotable member to move to the first position as the element is moved towards the seating via the supply path.

10. A device as claimed in claim 4, further comprising means for adjusting a position of said stop.

11. A device as claimed in claim 1, further comprising means for adjusting a position of a pivot point of the pivotable member.

* * * * *